Oct. 1, 1963             G. ALFIERI             3,105,517
PRESSURE REGULATOR FOR COMPRESSED AIR
INSTALLATIONS FOR MOTOR VEHICLES
Filed Feb. 2, 1962
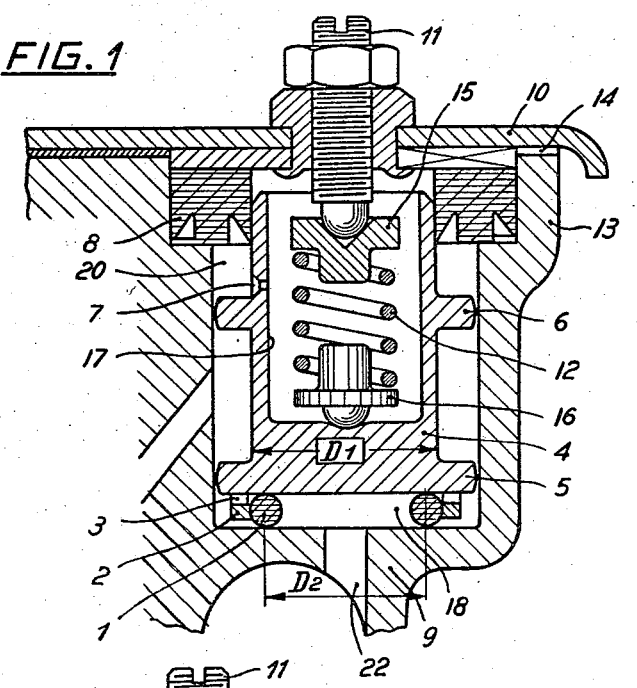
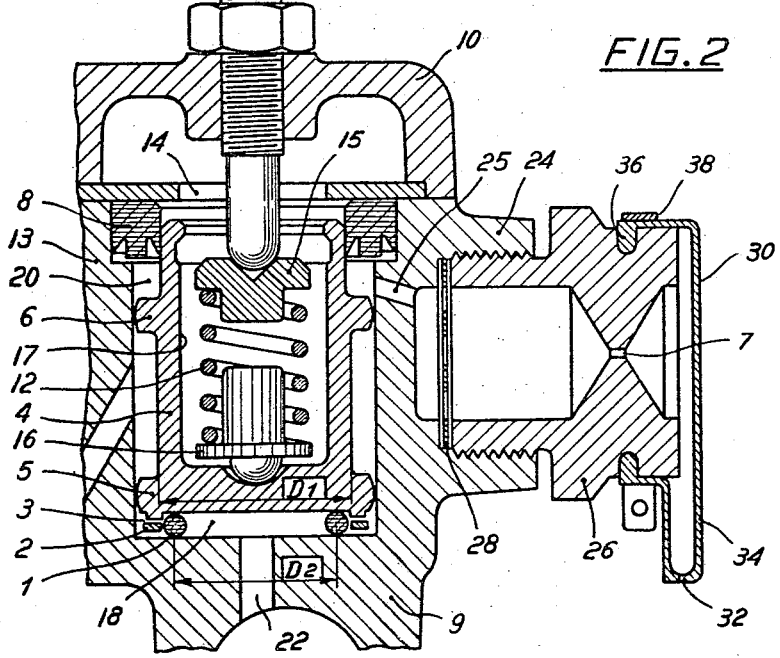
INVENTOR.
Giuseppe Alfieri
BY
Stevens, Davis, Miller & Mosher
Attorneys

United States Patent Office 3,105,517
Patented Oct. 1, 1963

3,105,517
PRESSURE REGULATOR FOR COMPRESSED AIR INSTALLATIONS FOR MOTOR VEHICLES
Giuseppe Alfieri, Milan, Italy, assignor to Fabbrica Italiana Magneti Marelli S.p.A., a corporation of Italy
Filed Feb. 2, 1962, Ser. No. 170,658
Claims priority, application Italy Feb. 16, 1961
11 Claims. (Cl. 137—540)

The present invention relates to a pressure regulator for compressed air, particularly for motor vehicles.

In compressed air installations, particularly for motor vehicles, wherein the compressor is directly actuated by the motor, a pressure regulator is used, whose purpose is to permit the compressor to work idle whenever a pressure higher than the normal operating pressure is established in the main reservoir.

Such a regulator consists essentially of an adjustable valve and a pneumatic servo control associated with a valve fitted to connect the delivery conduit of the compressor with the exhaust.

The operation of the regulator takes place as follows: in the rest position the adjustable valve, maintained on the seat thereof by a spring, intercepts the communication between the reservoir and the exhaust control, allowing the charging of the reservoir itself to the maximum operating pressure (for instance 7.5 atmospheres). At such a pressure the pneumatic thrust exerted upon the regulating valve exceeds the strength of the spring, determining the opening of the said valve and, consequently, the feeding of the servo-control, the piston whereof, in opposition to the action of the spring, connects the delivery of the compressor to the exhaust, allowing the said compressor to become idle, whereas the reservoir remains under pressure by the action of a check valve, preventing the release of the air into the atmosphere.

With the reduction of the pressure in the reservoir to the minimum operating pressure (f.i. to 7 atm.) following the draw-off of air, the regulating valve is replaced on the seat thereof by the spring, the action whereof prevails over the pneumatic pressure; consequently, upon the ceasing of the feed to the servo-control the pressure acting on the piston of the said servo-control rapidly lessens, in that the residual air under pressure discharges, through a calibrated hole communicating with the exterior, and the exhaust valve is closed permitting the recharging of the reservoir by means of the compressor.

The present invention relates to a pressure regulator which, with respect to the seat presently in use, presents the advantage of eliminating any welding of elastic seal members with their metal supports and excluding the possibility of clogging or occlusion by means of foreign bodies of the calibrated discharge hole of the pneumatic servo-control.

Besides this, the said regulator presents other advantages, such as an extreme sensitivity, an absolute reliability of operation and simplicity of construction, mounting and maintenance.

The regulator according to the invention, comprising a cylinder in which slides a piston against the action of spring means and providing a valve responsive to the pressure of the compressed air of the installation, and controlling, through a calibrated hole, the communication between the installation and the ambient atmosphere is characterized by the fact that, between the piston head and the cylinder bottom, a resilient material toric ring is disposed, ensuring the seal when the same is in contact with the said parts, and with which ring a rigid armature member cooperates externally, the outer diameter of the said ring being less than the diameter of the piston head, while the inner diameter of such ring is larger than the feeding hole upon the bottom of the cylinder and coaxial with the ring itself. So as to allow the revision and cleaning of the calibrated hole in an advantageous realization of the regulator, such calibration is carried by an element, removably fastened to the body of the regulator itself to allow by removing the said element, for the inspection and cleaning of the calibrated hole.

Advantageously, and with the aim of preventing the clogging of the calibrated hole, the removable element is combined with filter means arranged upstream of the said hole and which thus hold the material eventually in suspension in the compressed air.

The invention will now be explained by the following description relative to a preferred form of the invention and an embodiment as shown in the appended drawings by way of example, wherein:

FIG. 1 is an axial section of the regulator,
FIG. 2 is an axial section of an embodiment.

With reference to FIG. 1, there is shown an elastic ring 1, a rigid ring 2 having a height less than the elastic ring and presenting radial holes 3 connected to the lower end of the piston 4 that slides in the cylinder 13 of the regulator. The piston 4 is provided with guides, constituted by at least two flanges 5 and 6 set axially apart from each other and from the internal wall of the cylinder so as to form passages for the compressed air present in the annular chamber 20, in communication with the servo control chamber (not illustrated) and through a calibrated hole 7, with the internal chamber 17 of the piston 4. The flange 5 is, preferably, flush with the piston head. The cylinder 13—at its opening—is provided with a groove for an annular sealing gasket 8 in the inner surface whereof the upper end of the piston 4 is free to slide. The diameter $D_1$ of the said piston is slightly greater than the sealing diameter $D_2$ of the ring 1.

The gasket 8 is held within the relative groove by a cover 10, provided with a screw member 11 for adjusting the desired strength of the valve spring 12 of the valve.

The said spring is mounted between two end pieces 15 and 16 respectively, held by the end of the adjusting screw 11 and by the bottom of the chamber 17 of the piston 4, in such a way that spring and end pieces are arranged in the said chamber.

Between the cover 10 and the cylinder 13 some openings 14 are provided suitably protected from the infiltration of dust and which serve for putting the chamber 17 of the piston 4 into communication with the ambient atmosphere.

The operation of the regulator is as follows: when the pressure in chamber 18 passing through hole 22 from the compressor exceeds the pre-established value, the piston 4 is displaced against the action of spring 12. The rigid ring 2, solid with the said piston is, consequently, carried along, whereas the resilient ring 1 remains resting on the bottom 9 and the compressed air—through the radial holes 3 and the passages 5, 6 reaches the chamber 20. Naturally, the movement of the piston 4 is so regulated that at least a portion of the ring 1 is at all times in contact with the rigid ring 2.

Considering the embodiment of FIG. 2 in which the parts similar to those of FIG. 1 are identified by the same reference, the cylinder 13, wherein slides the piston 4, presents laterally a threaded projection 24 which, by means of a hole 25, communicates with the chamber 20 and holds a threaded plug 26, axially bored and having, in a suitable position, a calibrated hole 7 which discharges the compressed air. The threaded hole of the projection 24 terminates with a shoulder designed to hold the border of a filtering element 28 of a conventional type. The plug 26, when screwed in to the said projection, grips and removably holds the said element 28 to the cylinder 13. The calibrated hole 7 is protected toward the exterior by a cap 30 made of resilient material like rubber, presenting in a suitable position at least one discharge aperture provided with a non-return valve automatically opening as soon as a certain pressure is established in the interior of the cap.

In the case considered, the said discharge aperture consists in a cut or slit 32 formed in projection 34 provided laterally of the cap 30, the said projection being obviously deformable for automatic opening and closing when the pressure inside the cap stabilizes and ceases.

The border of the cap 30 engages with a peripheral groove 36 formed in the plug 26, while a tightening collar 38 additionally secures the said cap to the plug itself.

The operation of the regulator according to this embodiment is the same as the operation of the previously described regulator.

The air coming from the delivery conduit of the compressor, through the hole 22 lifts the piston 4 and from the holes 3 of the ring 2, passes into the cylinder 13 and, through the passage flanges 5 and 6 formed on the piston passes into the chamber 29. From the latter, by means of the hole 25, it traverses the filter 28 and the calibrated hole 7 to discharge into the atmosphere through the slit-valve 32.

The regulator described and illustrated may receive changes and modifications, for instance, instead of the rigid ring 2, connected to the lower extremity of the piston 4 a ring may be provided connected to the bottom 9 of the cylinder 13, or an externally free ring in contact with the interior side surface of the cylinder. Thus, the elastic ring 1 may also be provided with a stiff member of its own, constituted for instance, by a metal core, without leaving for this reason the ambit of the invention.

I claim:

1. A pressure regulator device comprising a cylinder, a piston movably disposed in said cylinder, spaced guide means disposed on said piston to guide same in said cylinder, said guide means forming passages between same and said cylinder, said piston having a chamber therein, spring means disposed between one end of the cylinder and the bottom of said chamber to maintain said piston in normal engagement with the other end of the cylinder, said cylinder having a hole at the other end to connect said cylinder with a source of compressed air, a ring-shaped elastic valve member disposed between said piston and the other end of said cylinder, and a ring element of less height than said valve member engaging said valve member exteriorly thereof, said ring element being connected to one of said other end of said cylinder and said piston, said ring element having holes disposed therein to allow compressed air to pass therethrough upon the compressed air exceeding the tension of the spring means to move said piston thereagainst, one of said cylinder and said piston having a calibrated hole therein to control the compressed air between said cylinder and the atmosphere.

2. A pressure regulator device according to claim 1 in which said guide means comprise flanges axially spaced on said piston.

3. A pressure regulator device according to the claim 2, in which one of the flanges is provided at the end of the piston cooperating with the elastic valve member.

4. A pressure regulator device according to claim 1 in which said ring element is connected to said piston and movable therewith relative to said valve member.

5. A pressure regulator device according to claim 1 in which said ring element is connected to the other end of said cylinder.

6. A pressure regulator device according to claim 1 in which adjustment means are operatively connected to said spring means to adjust the tension thereon.

7. A pressure regulator device according to claim 1 in which the diameter of said valve member at the sealing portion thereof is less than the diameter of said piston.

8. A pressure regulator device according to claim 1 further comprising plug means disposed in said cylinder and containing said calibrated hole, a protection cap carried by said plug means and communicating with said calibrated hole, said cap having an elastic portion having a slit therein to provide the discharge of compressed air therethrough to the atmosphere.

9. A pressure regulator device according to claim 8 wherein a filter means is disposed between said cylinder and said calibrated hole.

10. A pressure regulator device according to the claim 1, in which the calibrated hole is disposed in an element removably fastened to the cylinder for permitting with the removal of the said element the inspection and cleaning of the calibrated hole.

11. A regulator according to the claim 10 in which the pre-removable element carrying the calibrated hole comprises protection members arranged between the atmosphere in which the compressed air is discharged and the opening of the hole.

References Cited in the file of this patent

UNITED STATES PATENTS

| | | |
|---|---|---|
| 1,691,449 | Sharp | Nov. 13, 1928 |
| 2,899,972 | Mathews | Aug. 18, 1959 |

FOREIGN PATENTS

| | | |
|---|---|---|
| 1,064,159 | France | Dec. 23, 1953 |
| 97,787 | Netherlands | Apr. 17, 1961 |